Feb. 8, 1944.  A. A. SUNDELL  2,340,998
WHEEL AND TIRE LOCK
Filed May 29, 1942  3 Sheets-Sheet 1

Inventor
Axel A. Sundell

By Clarence A. O'Brien
and Harvey B. Jacobson
Attorneys

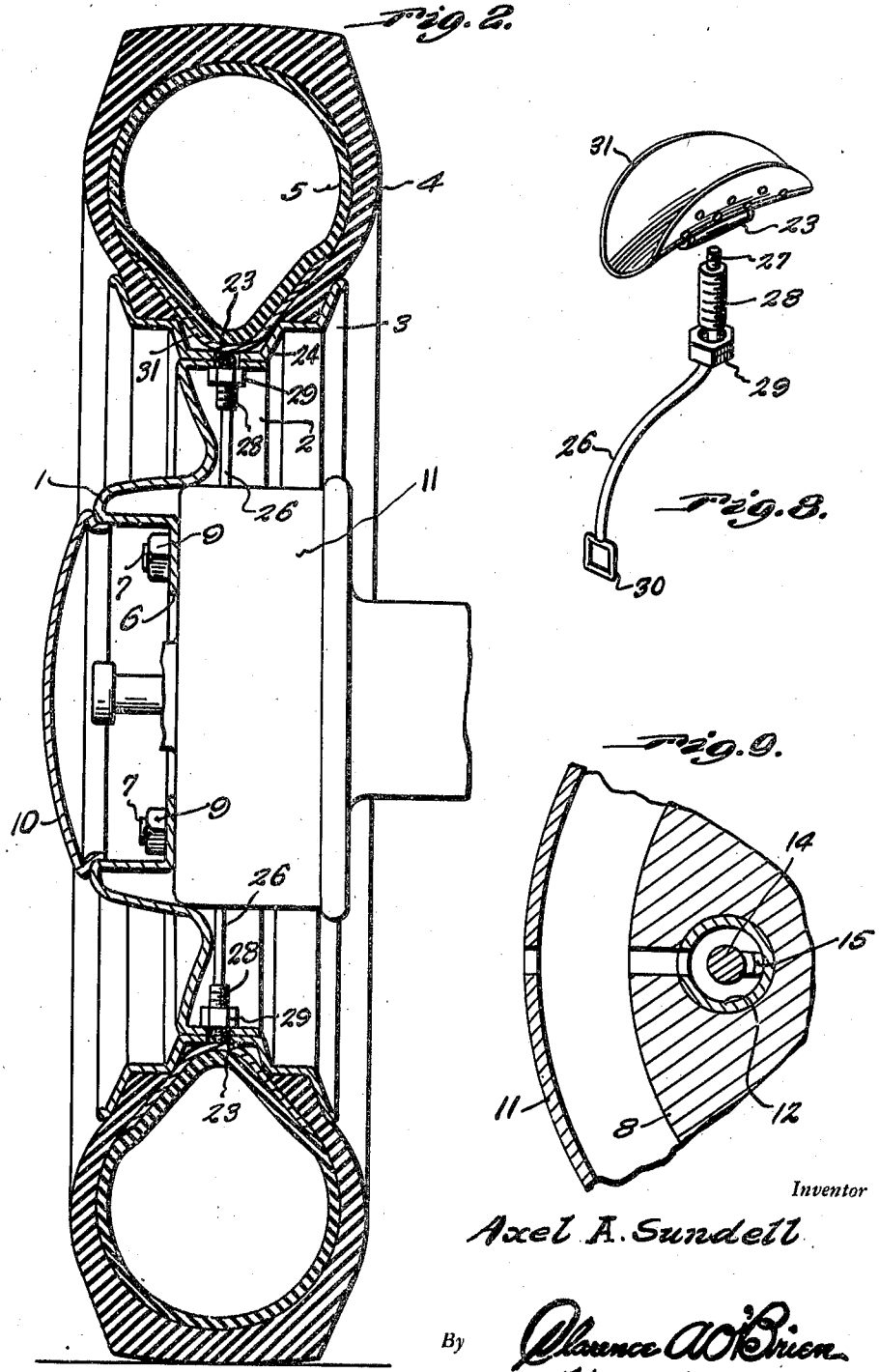

Feb. 8, 1944.   A. A. SUNDELL   2,340,998
WHEEL AND TIRE LOCK
Filed May 29, 1942   3 Sheets-Sheet 3
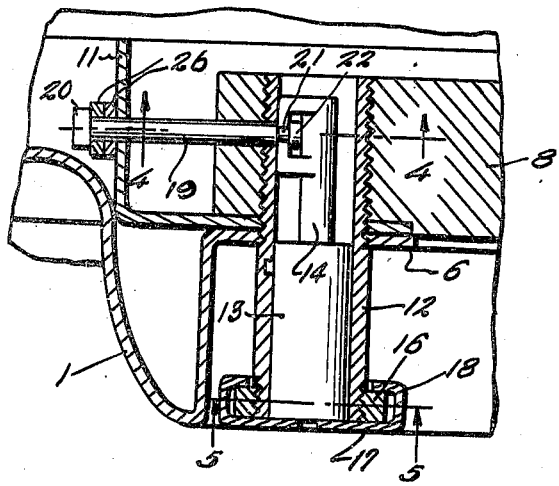
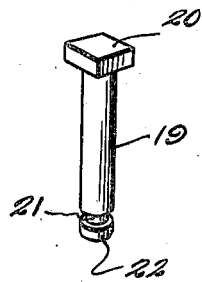
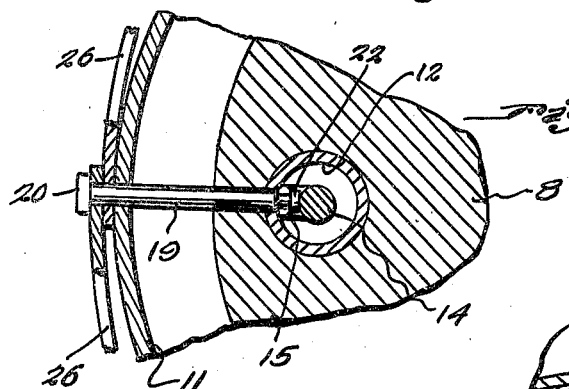
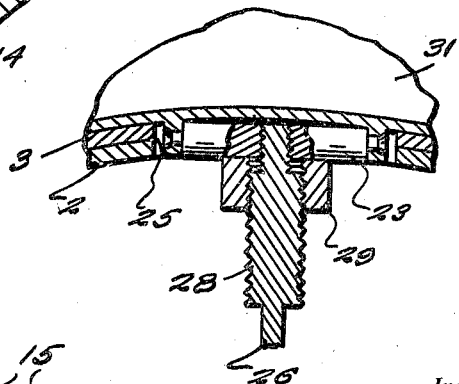
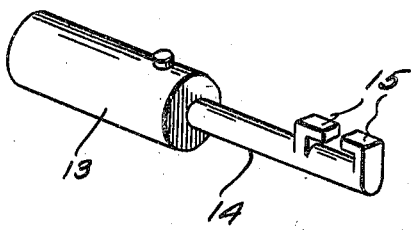
Inventor
Axel A. Sundell
By Clarence A. O'Brien
and Harvey B. Jacobson
Attorneys Patented Feb. 8, 1944

2,340,998

UNITED STATES PATENT OFFICE 2,340,998

WHEEL AND TIRE LOCK

Axel A. Sundell, Negaunee, Mich.

Application May 29, 1942, Serial No. 445,041

4 Claims. (Cl. 70—259)

The present invention relates generally to new and useful improvements in locks for motor vehicles, and has for its primary object to provide, in a manner as hereinafter set forth, novel means for locking a wheel to its hub against unauthorized removal and for positively securing a tire on the rim of the wheel.

Other objects of the invention are to provide a vehicle wheel and tire lock of the character described which will be comparatively simple in construction, strong, durable, highly efficient and reliable in use, inconspicuous, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a vertical sectional view.

Figure 3 is a fragmentary view in horizontal section, taken substantially on the line 3—3 of Figure 1.

Figure 4 is a fragmentary view in vertical section, taken substantially on the line 4—4 of Figure 3.

Figure 6 is a detail view in perspective of the removable lock secured pin.

Figure 7 is a detail view in perspective of the lock.

Figure 8 is a perspective view of the tire clamping means.

Figure 9 is a vertical sectional view substantially similar to Figure 4 but with parts omitted and showing the lock in inoperative position.

Figure 10 is a fragmentary view in vertical section through one of the tire clamping means.

Figure 1:
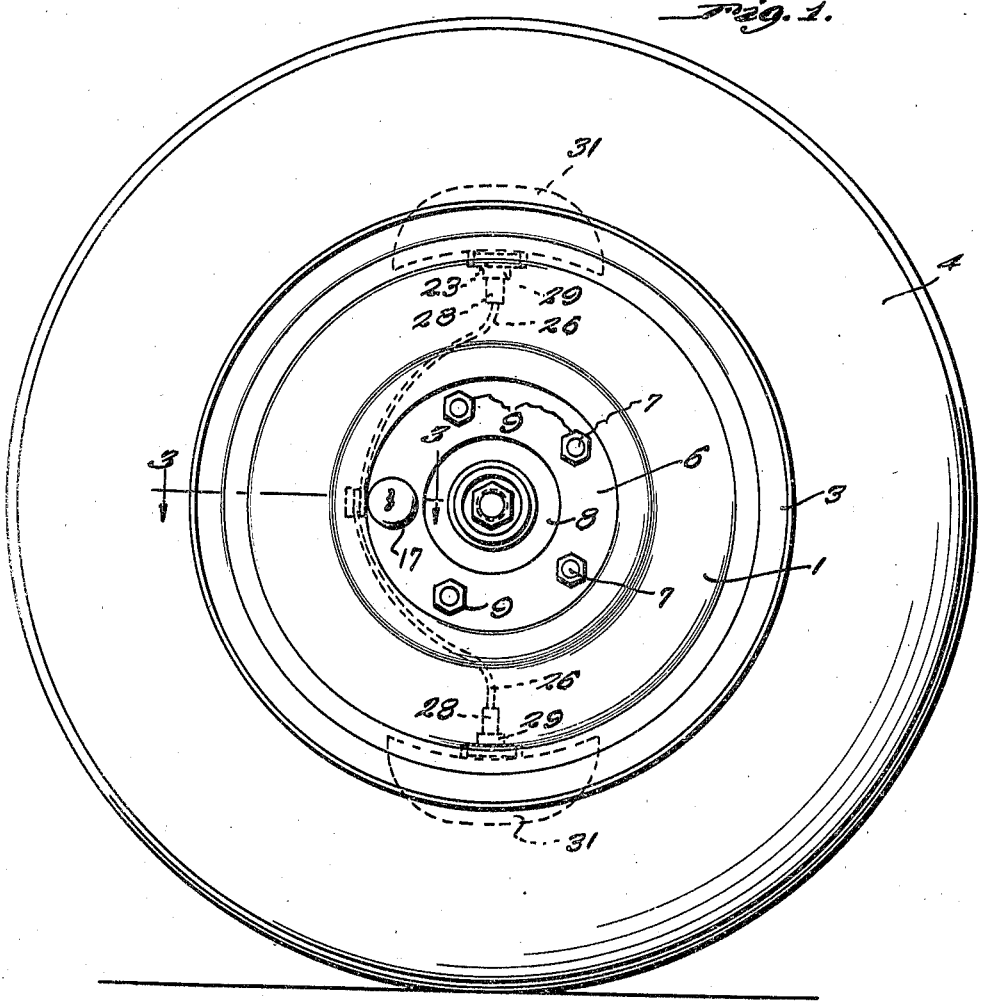
Figure 1 is a view in side elevation of a vehicle wheel equipped with a locking mechanism constructed in accordance with the present invention, the hub cap of said wheel being removed.
Figure 5:
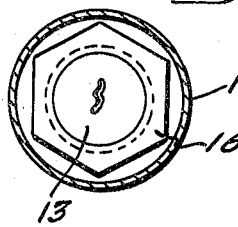
Figure 5 is a cross-sectional view, taken substantially on the line 5—5 of Figure 3.

Referring now to the drawings in detail, it will be seen that reference numeral 1 designates a metallic wheel which is provided with a felly 2 having mounted thereon a fixed rim 3 of the drop center type. A tire casing on the rim 3 is indicated at 4. An inner tube 5 is shown in the casing 4.

In the embodiment shown, the wheel 1 comprises an inwardly offset inner flange 6 which is apertured to receive bolts 7 which project from the hub flange 8, securing nuts 9 being threaded on said bolts. A removable hub cap on the wheel 1 is indicated at 10. Reference numeral 11 designates a brake drum on the hub flange 8.

One of the bolts 7 is removed and the opening left thereby is enlarged and threaded to accommodate a tubular casing 12. The outer portion of the tubular casing 12 has operatively mounted therein a suitable key actuated cylindrical lock 13. Projecting from the barrel of the lock 13 is a bolt 14 which is provided, on its free end portion, with a pair of opposed hooks 15. A nut 16 is threaded on the outer end portion of the tubular casing 12. A slotted retaining disk 17 for the lock cylinder 13 is secured on the tubular casing 12 by the nut 16, said disk having its peripheral portion formed to provide a channel 18 for the reception of said nut.

A removable pin 19 extends radially into the inner end portion of the tubular casing 12 through openings which are provided therefor in the hub flange 8 and the brake drum 11. The removable pin 19 is provided with a head 20 on its outer end. The inner end portion of the pin 19 includes a reduced neck 21 providing a head 22. The hooks 15 of the bolt 14 are engageable, upon rotation of said bolt, behind the head 22 for releasably securing the pin 19 in position. Thus, the pin 19 constitutes means for positively preventing the tubular casing 12 from being screwed out of the hub flange 8.

A pair of longitudinally curved clamps 31 of substantially V-shaped cross-section are mounted in the casing 4 for firmly securing said casing to the rim 3. Short shafts 23 are journaled on the clamps 31. Slots 25 in the felly 2 and the drop center 24 of the rim 3 accommodate the shafts 23.

Rods 26 have their outer end portions 27 threaded into diametrically extending openings which are provided therefor in the shafts 23. Adjacent the end portions 27, the rods 26 include threaded enlargements 28 on which lock nuts 29 are mounted. The rods 26 are provided, on their inner ends, with loops or eyes 30 for the reception of the outer end portion of the pin 19.

To remove the wheel 1, the hub cap 10 is taken off and the proper key is inserted in the lock 13 for rotating the bolt 14, thus swinging the hooks 15 to the position shown in Figure 9 of the drawings for freeing the pin 19 and permitting said pin to be withdrawn from the tubular casing 12. The tubular casing 12 is then removed, after which the nuts 9 are taken off for permitting removal of the wheel from the hub structure.

To remove the casing 4 from the rim 3, which casing, of course, is in a deflated condition, the pin 19 is removed from the eyes 30 and the nuts 29 are backed away from the felly 2 on the enlargements 28 of the rods 26. The rods 26 are then forced outwardly through the openings 25 for pushing the clamps 31 into the casing 4. The casing 4 is then manipulated in the usual way on the drop center rim 3 and pulled off, the clamps 31 swinging laterally on the shafts 23 to facilitate this operation. With the clamps 31 in operative position, as seen in Figure 2 of the drawings, the beads of the casing 4, between which said clamps are tightly wedged, are firmly secured against the side flanges of the rim 3. The casing being thus positively locked in position on the rim, said casing cannot come off in the event of an accident. This will also prevent the vehicle from being thrown in the event of a puncture or blow-out when traveling at high speed. Accordingly, many serious accidents will be prevented and safety promoted.

It is believed that the many advantages of a vehicle wheel and tire lock constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. In a wheel including a hub, a brake drum, a rim and a pneumatic tire casing on said rim, a lock comprising a plurality of clamps mounted in the casing for securing same on the rim, rods hingedly connected to said clamps, a tubular casing extending through the wheel and threadedly mounted in the hub, a removable pin connected to the rods and extending into said casing, and a lock cylinder operable in the casing, said lock cylinder comprising a rotary bolt including opposed hooks on one end portion engageable with the pin for releasably securing said pin in position.

2. In a wheel, a hub, a wheel member bolted to the hub and carrying a rim, a lock having a casing extending through said wheel member and removably threaded into said hub, said lock casing having means for preventing complete separation of the hub and wheel member when threaded into the hub, a pin removably extending through the hub and into the lock casing to prevent removal of said lock casing from the hub, said lock having a bolt operable to releasably engage and retain said pin against removal from the hub and the lock casing.

3. In a wheel, a hub, a wheel member bolted to the hub and carrying a rim equipped with a pneumatic tire casing, clamps mounted in and circumferentially spaced relative to the tire casing, rods connected to the clamps and extending toward each other to a point adjacent the hub, a lock having a casing extending through said wheel member and removably threaded into said hub, said lock casing having means for preventing complete separation of the hub and wheel member when threaded into the hub, a pin removably extending through the hub and into the lock casing to prevent removal of said lock casing from the hub, said lock having a bolt operable to releasably engage and retain said pin against removal from the hub and the lock casing, said pin being separably connected to said rods to retain the clamps in position for securing the tire casing on the rim when locked in place or to permit releasing the clamps when removed.

4. In a wheel, a hub, a wheel member bolted to the hub and carrying a rim equipped with a pneumatic tire casing, clamps mounted in and circumferentially spaced relative to the tire casing, rods connected to the clamps and extending toward each other to a point adjacent the hub, a lock having a casing extending through said wheel member and removably threaded into said hub, said lock casing having means for preventing complete separation of the hub and wheel member when threaded into the hub, a pin removably extending through the hub and into the lock casing to prevent removal of said lock casing from the hub, said lock having a bolt operable to releasably engage and retain said pin against removal from the hub and the lock casing, said pin being separably connected to said rods to retain the clamps in position for securing the tire casing on the rim when locked in place or to permit releasing the clamps when removed, the separable connection between the pin and said rods embodying overlapped eyes on the inner ends of the rods through which said pin extends, and a head on the outer end of said pin.

AXEL A. SUNDELL.